US006582303B1

(12) United States Patent
Weiss

(10) Patent No.: US 6,582,303 B1
(45) Date of Patent: Jun. 24, 2003

(54) GAMING DEVICE AND METHOD

(75) Inventor: Steven A. Weiss, Las Vegas, NV (US)

(73) Assignee: Casino Data Systems, Las Vegas, NV (US)

(*) Notice: Subject to any disclaimer, the term of this patent is extended or adjusted under 35 U.S.C. 154(b) by 0 days.

(21) Appl. No.: 09/687,805

(22) Filed: Oct. 13, 2000

(51) Int. Cl.[7] .......................... G07F 17/34; A63F 13/00
(52) U.S. Cl. ........................................... 463/16; 463/20
(58) Field of Search ............................. 463/16, 20, 25, 463/26, 27; 273/138.1, 143 R

(56) References Cited

U.S. PATENT DOCUMENTS 5,788,573 A * 8/1998 Baerlocher et al. ........... 463/16
6,159,097 A * 12/2000 Gura ........................... 463/20
6,190,255 B1 * 2/2001 Thomas et al. ............... 463/20
6,203,429 B1 * 3/2001 Demar et al. ................. 463/20
6,315,660 B1 * 11/2001 Demar et al. ................. 463/16

* cited by examiner

*Primary Examiner*—Jessica Harrison
(74) *Attorney, Agent, or Firm*—Bernhard Kreten

(57) ABSTRACT

A method and device for gaming, in which a primary game is played toward a winning outcome, and includes a bonus game that may be triggered by a particular outcome or outcomes. The bonus game is made up of a series of successive games centered around a common theme or directed toward a common outcome.

15 Claims, 5 Drawing Sheets

GAMING DEVICE AND METHOD

FIELD OF THE INVENTION

The following invention is generally related to instrumentalities and methodologies in gaming devices. More specifically, the instant invention is directed to a gaming device having a primary game having not only a winning outcome, but also a triggering outcome for a secondary game. Most specifically, the secondary game consists of a series of gaming propositions, all directed toward a common theme or outcome.

BACKGROUND OF THE INVENTION

The purpose of playing any game is to win the game. While a player may initially find enjoyment in trying to win a particular game, the proposition of repeatedly playing the same game eventually becomes tiresome. Accordingly, several games have been developed to offer a "bonus" game, which offers a player the prospect of engaging in a different gaming proposition. Most bonus games consist of only one round of bonus play. These games are often enjoyable, but disappointingly short in duration.

SUMMARY OF THE INVENTION

The present invention is distinguishable over the prior art in a multiplicity of ways. For example, the instant invention retains the player's interest by providing the player with a device and method for enjoying several different gaming propositions in a single gaming session.

Further, the instant invention allows a player to participate a series of gaming propositions, all directed toward a common theme or outcome.

OBJECTS OF THE INVENTION

Accordingly, it is a primary object of the present invention to provide a new and novel device and method for gaming in which a player is offered a series of secondary gaming propositions for more chances at success.

It is a further object of the present invention to provide a device and method for gaming in which a player has the opportunity to participate in a series of related gaming propositions, all directed toward a common theme or outcome.

Viewed from a first vantage point, it is an object of the present invention to provide a gaming device, comprising, in combination a display, wagering means, and a processor interposed between said display and said wagering means to initiate play of a primary game on said display upon activation of said wagering means, said display having at least one outcome which triggers a first bonus, wherein said first bonus has at least one outcome which triggers a second bonus.

Viewed from a second vantage point, it is an object of the present invention to provide a method for gaming, the steps including displaying a primary game, allowing a wager, generating an outcome for said primary game as a function of said wager having been made, enabling a first bonus upon the occurrence of at least one outcome from said primary game, and enabling a second bonus upon the occurrence of at least one outcome from said first bonus.

These and other objects will be made manifest when considering the following detailed specification when taken in conjunction with the appended drawing figures.

DESCRIPTION OF PREFERRED EMBODIMENTS

Figure 2:
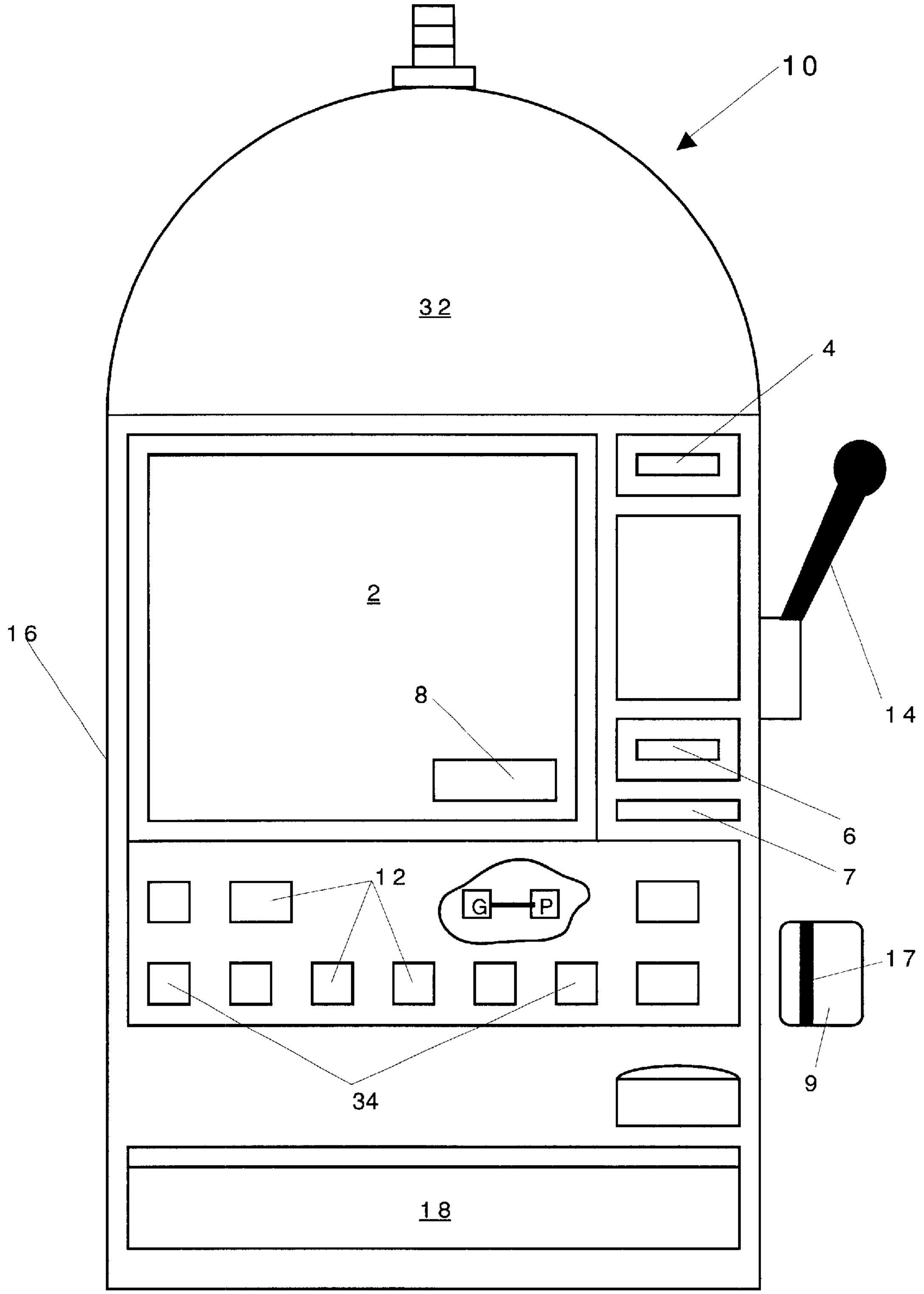
FIG. 2 is a depiction of the apparatus associated therewith.

Considering the drawings, wherein like reference numerals denote like parts throughout the various drawing figures, reference numeral 10 as shown in FIG. 2 is directed to the device according to the present invention.

In its essence, the device 10 includes a housing 16 which supports a visual display 2, preferably a video monitor, therewithin. The display 2 may include a window 8 for special messages or for incrementing counting of credits accumulated by the player. The device also includes an LED readout 4 for prompting the player and can provide similar verbiage as the window 8 or in lieu thereof, to stimulate the player. The device includes an inlet 6 for the reception therein for coins, currency or the like to auger in the inception of play. A plurality of decision-making buttons 12 are located on the face of the apparatus 10, preferable below the display 2 and a pull handle 14 can be used to initiate play as an alternative to supplement the decision-making buttons 12. A coin hopper, ticket printer, or other device 18 may be included to effectuate an output of an award due the player. The device 10 may have a top portion 32 with a display thereon having a motif correlative with the game to be played and can include a paytable. A plurality of speakers 34 may be included on the device for aural interaction with the player. The apparatus also includes a processor P coordinating all functions and a random number generator G operatively coupled thereto for generating outcomes. A card 9 provided with an information strip 17 can be read via input 7 as a substitute or supplement to credit transfers as well as player identification.

Figure 3:
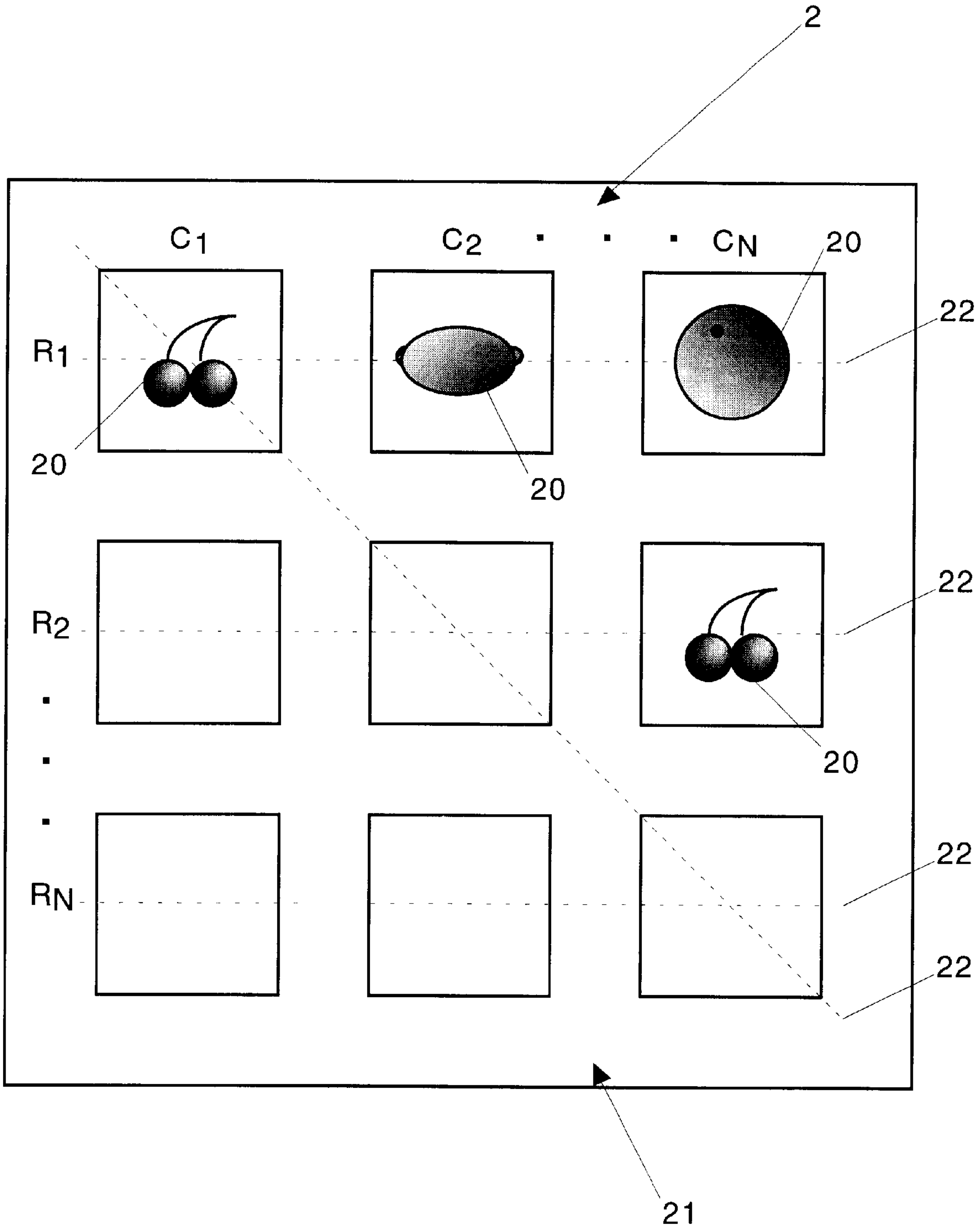
FIG. 3 is a depiction of a primary game screen, embodied in an RXC matrix.

More specifically, and with reference to FIG. 3, greater details with respect to the video display 2 can be explored. The display 2 features a plurality of symbols 20 arranged in a row and column (RXC) matrix 21. Paylines 22 correspond to areas on the matrix in which winning combinations may be located. The preferred embodiment features a 3×5 matrix with either 9, 15 or 25 paylines.

Figure 1:
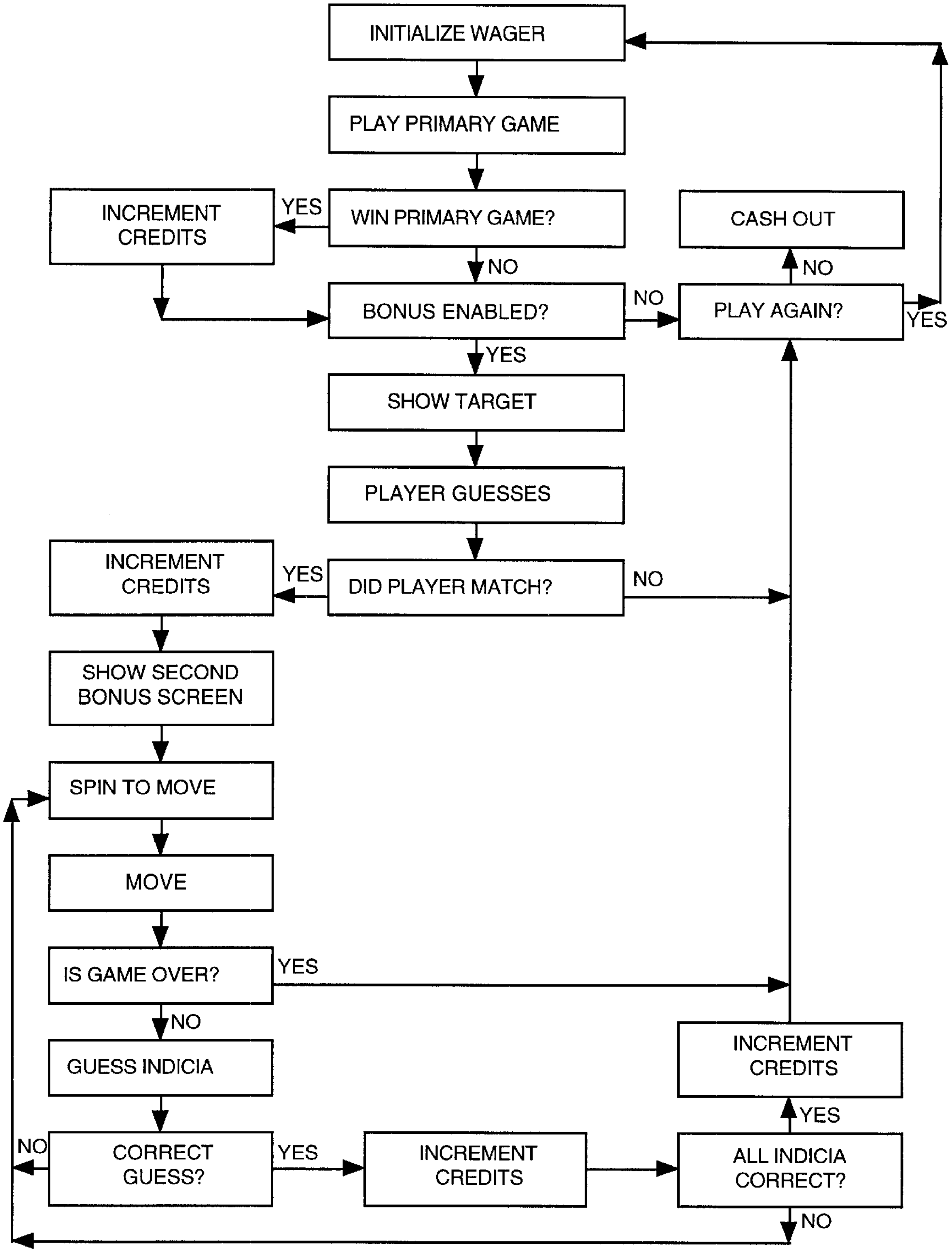
FIG. 1 is a flowchart of the methodology according to the present invention.

Referring to FIG. 1, the flow chart associated with the apparatus of FIGS. 2 and 3 can be explored. Initially, the player plays the game with a maximum bet or less. Preferably, but optionally, a maximum bet enables the features of the invention. Assume a maximum bet is required. If the player plays with less than a maximum bet, the outcome is determined by the symbols displayed according to the display in FIG. 3. If the player opts to play with a maximum bet, then after the initial outcome is displayed, the player is immediately rewarded if the initial outcome corresponds to a value on an associated paytable. Whether or not the player wins, the initial outcome is compared to a predetermined set of outcomes that trigger a bonus game.

Figure 4:
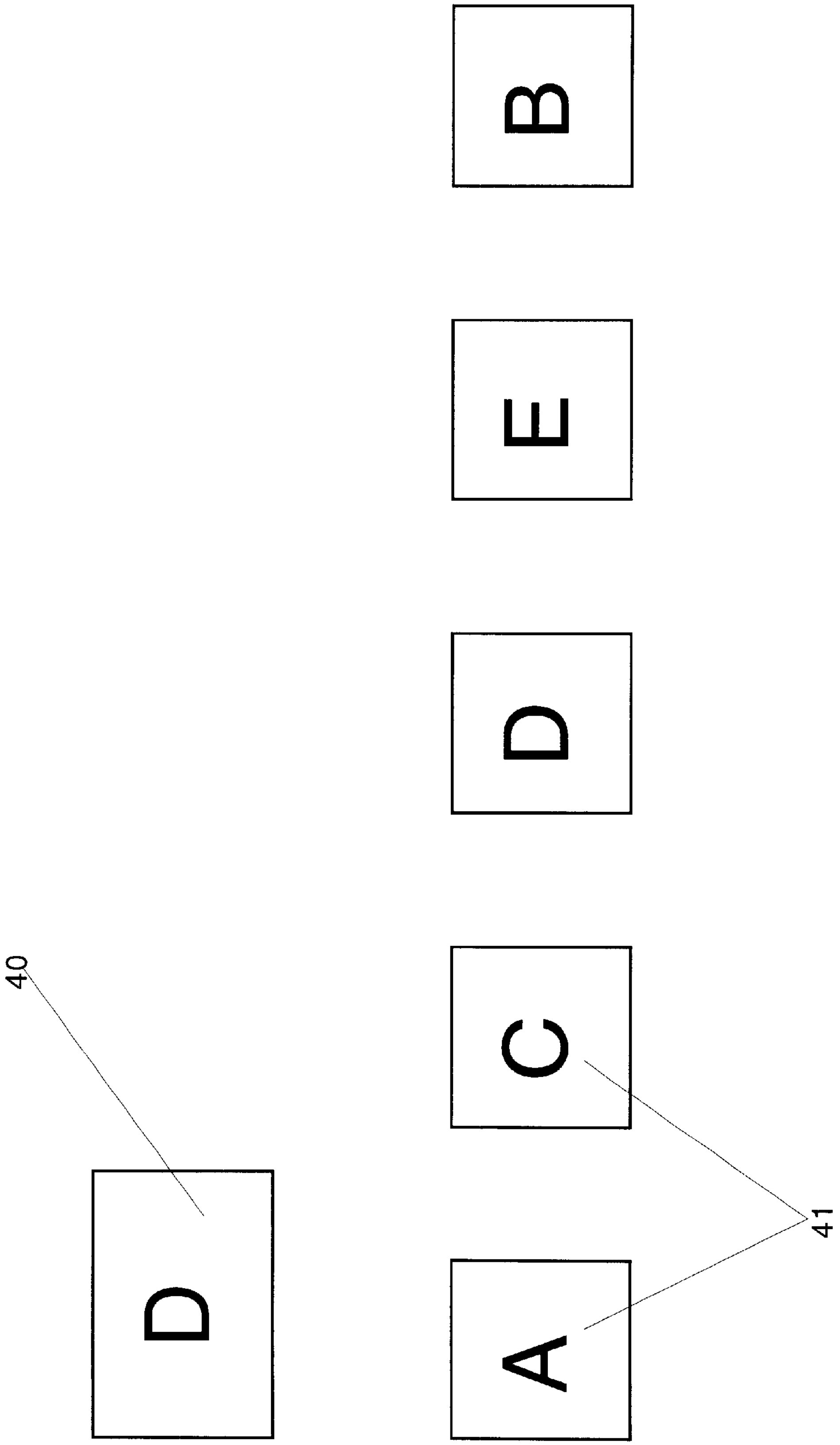
FIG. 4 is a depiction of a first bonus screen.

In the preferred embodiment, a triggering outcome enables a first bonus event, utilizing the display as shown in FIG. 4. Ideally, all bonus events are tied to solving a problem which entails identifying three independent indicia. The first bonus event is directed to matching the first indicia. The first indicia 40 is exposed to the player above a playfield containing unexposed cards 41. Preferably, there are five unexposed cards 41 in the playfield. The player is allowed to select one card which becomes exposed upon selection. If the exposed card matches the first indicia 40, the player is awarded a bonus and allowed to move to a second bonus event. Assume the game bonus theme involves, three variables: matching a person, a place and a thing. In the first bonus round, the player is trying to match one of the three variables to the indicia 40. Assume the first indicia is a person. The five unexposed cards 41 are directed to five people, one of whom "matches" indicia 40. More particularly, the player is trying to determine which of the five people represented by the cards "hid" the player's inheritance.

Figure 5:
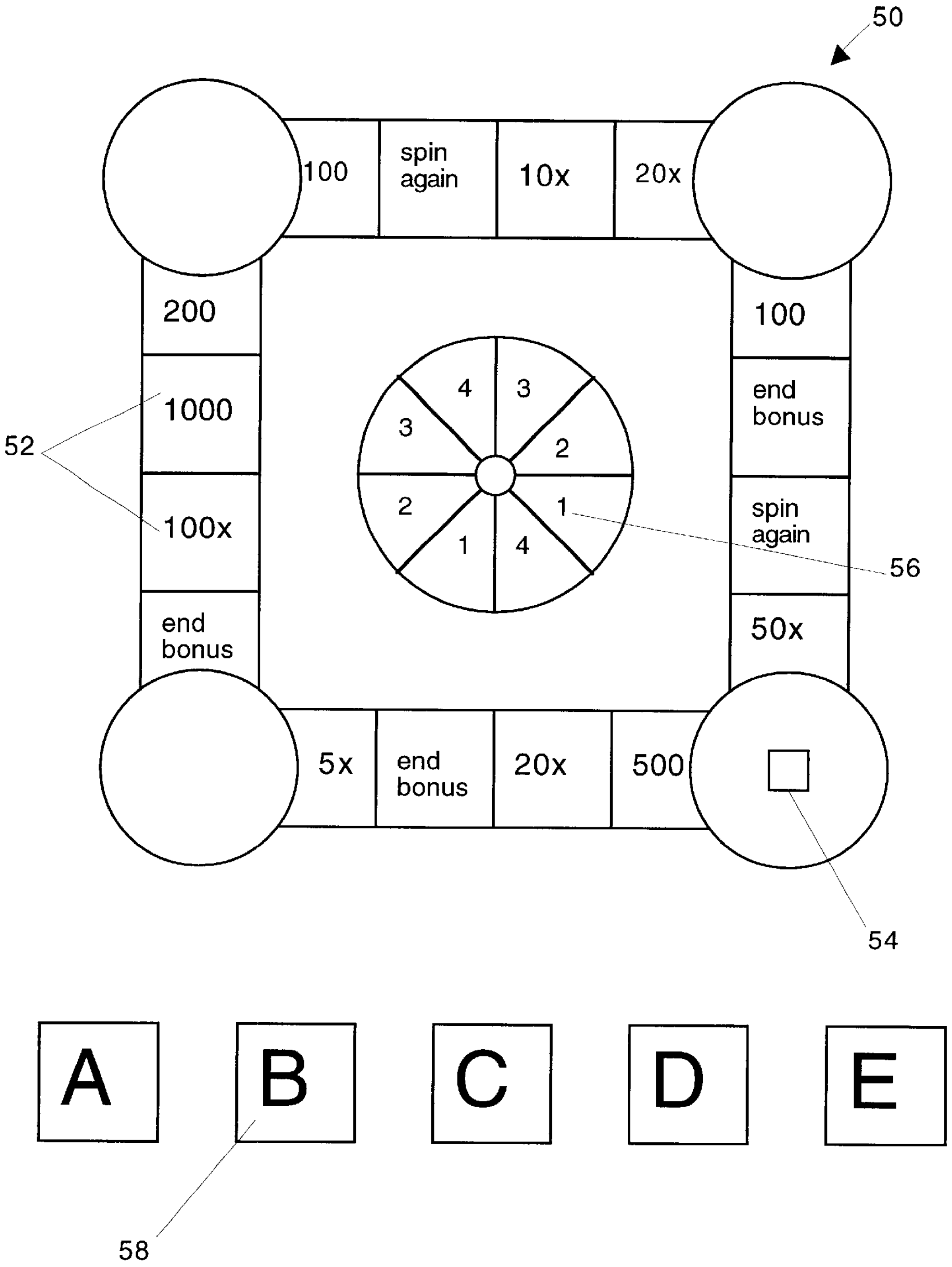
FIG. 5 is a depiction of a second bonus screen.

The second bonus event utilizes the display shown in FIG. 5. The preferred embodiment is a game board 50 containing a series of "locales" 52, defining a playing path. Some of the locales 52 may contain award amounts or multipliers, while others are game-ending locales. The player appears as a counter piece 54 on the board. A random number generator, pictured as a spinner 56, is activated, which indicates the locale to which the player's counter piece is to move to next. The player spins and advances the counter piece 54 to the appropriate locale. If the locale is a game-ending locale, the game ends and the player is awarded all credits accumulated from the bonus portion of the session and returned to the primary game. If the locale is not a game-ending locale, the player has an opportunity to guess the value of a pre-selected, unexposed second indicia. Continuing with the inheritance theme, the player must decide what kind of inheritance was hidden. For example, the inheritance or treasure may be currency, bullion, gems, negotiable instruments, rare coins, stamps, etc. A playfield of exposed cards 58, preferably consisting of five cards, appears below the game board 50. The cards 58 contain random indicia corresponding to the inheritance/treasure. If the player selects the card matching the second indicia, an award is credited to the player, and the game continues, with the player spinning and moving again. Once the second indicia is matched, play continues in the same manner to match the third indicia. Typically, the third indicia shows five potential sites where the inheritance was hidden. If the player matches all three indicia, the player is awarded all credits accumulated from the bonus portion of the session and returned to the primary game. The game continues until either all three indicia are matched or until the player lands on a game-ending locale.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A gaming device, comprising, in combination:

a display, wagering means, and a processor interposed between said display and said wagering means to initiate play of a primary game on said display upon activation of said wagering means, said display having at least one outcome which triggers a first bonus game, wherein said first bonus game has at least one outcome which triggers a second bonus game, wherein said first bonus game comprises:

a first exposed indicium, a plurality of unexposed cards assigned to randomly chosen indicia, wherein one of said plurality of unexposed cards matches said first exposed indicium, choice means for allowing a player to choose one of said plurality of unexposed cards, and comparison means for determining whether said indicium assigned to said player-chosen card matches said first exposed indicium.

2. A device according to claim 1 wherein said plurality of unexposed cards is five.

3. A device according to claim 1 wherein said second bonus game comprises:

random means for pre-selecting a second indicium, a first plurality of exposed cards, each assigned to random indicia, wherein one of said first plurality of exposed cards matches said second indicium, decision means for allowing player selection of a card from said first plurality of exposed cards, and comparison means for determining whether the indicium assigned to said player-selected card matches said second indicium.

4. A device according to claim 3 wherein said first plurality of exposed cards is five.

5. A device according to claim 3 wherein said second bonus game comprises:

random means for pre-selecting a third indicium, a second plurality of exposed cards, each assigned to random indicia, wherein one of said second plurality of exposed cards matches said third indicium, decision means for allowing a player to select a card from said second plurality of exposed cards, and comparison means for determining whether the indicium assigned to said player-selected card matches said third indicium.

6. A device according to claim 5 wherein said second plurality of exposed cards is five.

7. A device according to claim 5 wherein said second bonus game further comprises:

a playing path having a series of locales, a random counter means for indicating magnitude of position changes about said series of locales along said playing path, said random counter means embodied as a spinner, and position indication means for visually indicating position of a player by way of a counter piece located on a particular locale according to a value posted by said random counter means.

8. A device according to claim 7 wherein said series of locales includes a subset of locales exhibiting randomly-generated award values.

9. A device according to claim 8 wherein said series of locales includes a subset of locales triggering the end of said second bonus game and wherein matching said third indicium ends said second bonus game.

10. A device according to claim 9 wherein said subset of locales triggering the end of said second bonus game is randomly chosen each time said random counter means is engaged, but prior to engaging said random counter means.

11. A method for gaming, the steps including:

displaying a primary game, allowing a wager, generating an outcome for said primary game as a function of said wager having been made, enabling a first bonus game upon the occurrence of at least one outcome from said primary game, wherein said first bonus game includes the step of matching an exposed symbol with one of plural unexposed symbols, and enabling a second bonus game upon the occurrence of at least one outcome from said first bonus game, wherein said second bonus game includes the step of advancing a counter piece along a playing path comprising a series of locales, wherein at least one of said locales triggers an opportunity for selecting one of plural exposed indicia.

12. The method of claim 11 wherein said first bonus game further includes the step of providing an opportunity to match indicia representing a person.

13. The method of claim 12 wherein the second bonus game further includes the step of matching indicia representing a thing.

14. The method of claim 13 wherein said first bonus game or said second bonus game further includes the step of matching indicia representing a place.

15. A gaming device, comprising, in combination:

a display;

a processor having random generator means;

a wager sensor which, once activated by a wager, causes said processor to drive said display and provide a game under control of said random generator;

said game including:

a) a playfield displaying one exposed indicium and plural unexposed indicia;

means to allow a player to select one of said unexposed indicia and reveal its value;

a comparator for comparing said exposed indicium with the value of said player-selected indicium;

award means for awarding a player if said comparator detects a match;

b) a playing path having plural locales, said playing path displayed upon the occurrence of a match;

means for advancing a counterpiece along said playing path;

at least one locale enabling said display to provide plural exposed indicia and means to allow a player to select and compare one exposed indicium with a randomly chosen match;

at least one locale causing said game to end, and at least one locale which directly bestows an award.

* * * * *